(12) United States Patent
Lee (10) Patent No.: US 12,499,714 B2
(45) Date of Patent: *Dec. 16, 2025

(54) IMAGE PROCESSING DEVICE, IMAGE PROCESSING METHOD, AND STORAGE MEDIUM (71) Applicant: NEC Corporation, Tokyo (JP)

(72) Inventor: Kapik Lee, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 18/397,130

(22) Filed: Dec. 27, 2023

(65) Prior Publication Data
US 2024/0153316 A1 May 9, 2024

Related U.S. Application Data (63) Continuation of application No. 17/622,306, filed as application No. PCT/JP2020/015257 on Mar. 27, 2020, now Pat. No. 11,881,056.

(51) Int. Cl.
G06V 40/40 (2022.01)
G06T 7/246 (2017.01)
(Continued)

(52) U.S. Cl.
CPC ............. *G06V 40/45* (2022.01); *G06T 7/248* (2017.01); *G06T 7/74* (2017.01); *G06V 40/167* (2022.01);
(Continued)

(58) Field of Classification Search
CPC ...... G06V 40/45; G06V 40/167; G06V 40/67; G06V 40/40; G06V 40/161; G06V 40/19; G06V 20/597; G06V 40/193; G06V 40/197; G06V 40/18; G06V 40/172; G06V 40/168; G06V 40/166; G06V 10/751; G06V 10/757; G06V 40/50; G06V 20/20; G06V 20/52; G06V 40/16; G06V 40/70; G06T 7/248; G06T 7/74; G06T 2207/30196; G06T 7/55; G06T 15/10; G06T 11/00;
(Continued)

(56) References Cited

U.S. PATENT DOCUMENTS 11,227,157 B1 * 1/2022 Mathew ................. G06V 40/19
11,881,056 B2 * 1/2024 Lee .......................... G06T 7/248
(Continued)

FOREIGN PATENT DOCUMENTS

EP 2546782 A1 1/2013
EP 3373202 A1 9/2018
(Continued)

OTHER PUBLICATIONS

Meaning of concurently (Year: 2025).*
(Continued)

*Primary Examiner* — Nimesh Patel (57) ABSTRACT

An image processing device includes a receiver configured to receive a plurality of images of a subject from a camera; and a processor configured to: calculate, for each of the plurality of images, an angle difference between a gaze angle and a head angle of the subject to obtain a series of angle differences; and determine an authenticity of the subject at least based on the series of angle differences.

20 Claims, 5 Drawing Sheets (51) Int. Cl.
  *G06T 7/73* (2017.01)
  *G06V 40/16* (2022.01)
  *G06V 40/60* (2022.01)
(52) U.S. Cl.
  CPC .... *G06V 40/67* (2022.01); *G06T 2207/30196* (2013.01)
(58) Field of Classification Search
  CPC ......... G06T 19/006; G06T 2207/30201; G06T 7/0012; G06T 2207/30268; G06T 2207/10016; G06T 2207/10024; G06T 2207/10148; G06T 2207/10152; G06T 2207/30041; G06T 7/0014; G06T 7/246; G06T 15/00; G06T 2210/36; G06T 7/70; G06T 7/73; G06T 19/00; G06F 3/013; G06F 3/012; G06F 21/32; G06F 21/316; G06F 21/64; G06F 18/00; G06F 18/2431; G01J 2005/0077; G01J 5/0025; G01J 5/12; G01J 5/064; B60R 25/25; B60R 2325/10; B60R 25/01; B60R 25/2018; B60R 25/305; B60R 25/34
  See application file for complete search history.

(56) References Cited

U.S. PATENT DOCUMENTS

| | | | |
|---|---|---|---|
| 2010/0156781 A1* | 6/2010 | Fahn | H04N 7/144 345/156 |
| 2010/0208206 A1* | 8/2010 | Connell, II | A61B 3/113 351/210 |
| 2013/0016882 A1 | 1/2013 | Cavallini | G06F 18/22 382/117 |
| 2015/0379332 A1* | 12/2015 | Matsunaga | G06V 40/172 348/77 |
| 2016/0062456 A1* | 3/2016 | Wang | G06F 3/013 382/117 |
| 2017/0185760 A1* | 6/2017 | Wilder | G06F 21/32 |
| 2017/0193285 A1* | 7/2017 | Negi | G06V 40/172 |
| 2018/0260643 A1* | 9/2018 | Sheikh Faridul | G06V 40/45 |
| 2019/0034606 A1* | 1/2019 | Mapen | G06F 21/36 |
| 2021/0073364 A1* | 3/2021 | Sakai | G06V 40/172 |
| 2022/0280035 A1* | 9/2022 | Zakharov | G02C 13/005 |

FOREIGN PATENT DOCUMENTS

| | | |
|---|---|---|
| JP | 2004-030564 A | 1/2004 |
| JP | 2008-015800 A | 1/2008 |
| JP | 2009-244949 A | 10/2009 |
| JP | 2019-197426 A | 11/2019 |
| WO | 2014/184436 A1 | 11/2014 |
| WO | 2016/059786 A1 | 4/2016 |
| WO | 2019/151368 A1 | 8/2019 |

OTHER PUBLICATIONS

Meaning of simultaneously (Year: 2025).*
International Search Report for PCT Application No. PCT/JP2020/015257, mailed on Jun. 23, 2020.
Extended European Search Report for EP Application No. 20926699.8, dated on Mar. 14, 2023.
Ali Asad et al : "Gaze stability for liveness detection", Pattern Analysis and Applications, Springer, New York, NY, US , vol. 21, No. 2, Nov. 10, 2016 (Nov. 10, 2016), pp. 437-449, XP036486817, ISSN: 1433-7541, DOI: 10.1007/S10044-016-0587-2 [retrieved on Nov. 10, 2016].
JP Office Action for JP Application No. 2023-118702, mailed on May 14, 2024 with English Translation.
JP Office Communication for JP Application No. 2023-118702, mailed on Oct. 1, 2024 with English Translation.
JP Office Action for JP Application No. 2024-187241, mailed on Jul. 1, 2025 with English Translation.

* cited by examiner

IMAGE PROCESSING DEVICE, IMAGE PROCESSING METHOD, AND STORAGE MEDIUM

This application is a continuation application of U.S. patent application Ser. No. 17/622,306 filed on Dec. 23, 2021, which is a National Stage Entry of PCT/JP2020/015257 filed on Mar. 27, 2020, the contents of all of which are incorporated herein by reference, in their entirety.

TECHNICAL FIELD

The present disclosure relates to an anti-spoofing image processing device, an anti-spoofing method, and a computer-readable storage medium.

BACKGROUND ART

Recently, electronic devices and the like use biometric data for purposes such as facial recognition to restrict access to data or simply recognize an individual by way of their particular facial characteristics. Personal security, the threat of identity theft, and the like have become major concerns, and bad actors have attempted to use various techniques to overcome automated identity recognition security methods, particularly to gain unauthorized access to data on or the use of electronic devices. Facial recognition has been one security method of countering unauthorized access to devices, such as smartphones, smartpads, laptops, personal computers, game systems, and the like, equipped with, for example, a digital camera. However, facial recognition can be intentionally made to falsely recognize a person (hereinafter sometimes referred to as "spoofing") by using photographs, video images, masks, or the like.

Some techniques have been implemented to assist in overcoming such deficiencies in facial recognition methods. For example, in PTL 1, teaches taking a plurality of images from the camera to detect whether or not it is viewing a still image or a living human face using a threshold comparison.

Another method, such as that described in PTL 2, is known in which a stimulus is provided on a screen to cause a subject's facial reaction, and the subject's facial movement is tracked by a camera and compared to a predicted model of facial reactions to confirm that the subject is human.

Another method, such as that described in PTL 3, is known in which images are displayed on a screen to cause a subject to move their eyes, and the subject's eyes are tracked by a camera to confirm that the subject is human.

Another method described in PTL 4 proposes tracking the gaze angle of a subject and having the subject respond to a challenge such as gazing toward numbered positions on a display device in the order of a passcode.

However, even these methods may still be vulnerable to a spoof attack in which, for example, a three dimensional mask is used.

CITATION LIST

Patent Literature

[PTL 1]
EP2546782 A1
[PTL 2]
EP3373202 A1
[PTL 3]
US2017/0185760 A1
[PTL 4]
US2019/0034606 A1

SUMMARY

Technical Problem

There is demand for a technique to overcome vulnerabilities in facial recognition technology that can properly recognize a living subject even when spoofing methods are attempted.

Therefore, an example object of the present disclosure is to provide an image processing device, an image processing method, and a storage medium capable of preventing unauthorized access even when spoofing methods are attempted.

Solution to Problem

A first aspect of the present disclosure provides an image processing device including a camera configured to capture a plurality of images of a subject; and a processor configured to calculate a gaze angle and a head angle of the subject from each of the images and determine the authenticity of the subject based in part on differences between the gaze angle and the head angle of respective images.

A second aspect of the present disclosure provides an image processing method including capturing a plurality of images of a subject via a camera calculating, by way of a processor, a gaze angle and head angle of the subject from each of the images; and determining, by way of the processor, the authenticity of the subject based in part on differences between the gaze angle and the head angle of respective images.

A third aspect of the present disclosure provides a computer-readable storage medium containing instructions to cause a computer to execute: capturing a plurality of images of a subject via a camera calculating, by way of a processor, a gaze angle and head angle of the subject from each of the images; and determining, by way of the processor, the authenticity of the subject based in part on differences between the gaze angle and the head angle of respective images.

EXAMPLE EMBODIMENTS

Exemplary embodiments of the present disclosure will be described below with reference to the drawings. In the drawings, the same elements are denoted by the same reference numerals, and thus redundant descriptions are omitted as needed.

Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or sub-combinations in one or more embodiments or examples.

Example Embodiment

As an example embodiment of the present disclosure, an image processing device will be described hereinafter with reference to figures.

In this example, the image processing device is a mobile phone where the mobile phone belongs to an owner (i.e., target) whose facial feature points are stored in a storage unit 108 in advance. When a subject attempts to unlock or use the mobile phone, it may be necessary for the mobile phone to identify that the subject is the owner or an otherwise authorized user. In order to confirm that the subject is properly allowed to use the mobile phone, a facial recognition process is initiated. Alternatively, the image processing device may be a security device that identify authorized personnel and grant restricted activities such as access to sensitive information or entry to a restricted area.

Figure 7:
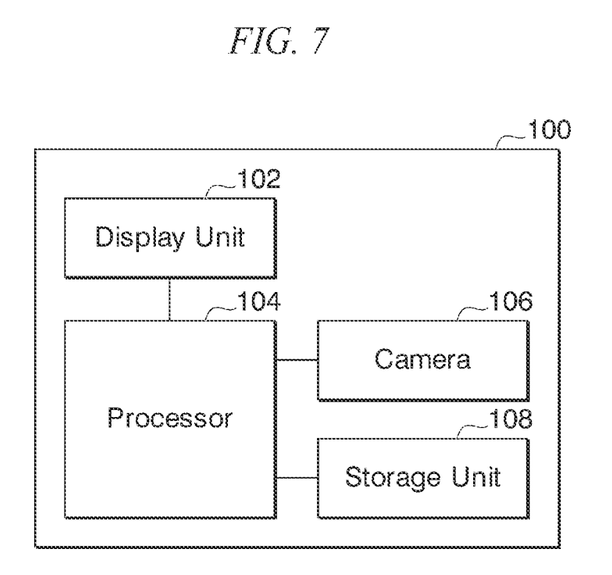
FIG. 7 illustrates a block diagram of an example image processing device of the present disclosure.

As shown in FIG. 7, the image processing device 100 according to this example includes a processor 104, a camera 106, and a storage unit 108. The image processing device may optionally include a display unit 102.

First, the camera 106 of the image processing device 100 captures an image of the subject. From the captured image, the processor 104 extracts facial feature points of the subject's face and for comparison with the target, the facial feature points of which are pre-stored in the storage unit 108. If such comparison determines a match, the image processing device 100 then attempts to determine whether or not the subject is a living person (i.e., confirm the liveliness of the subject).

Figure 1:
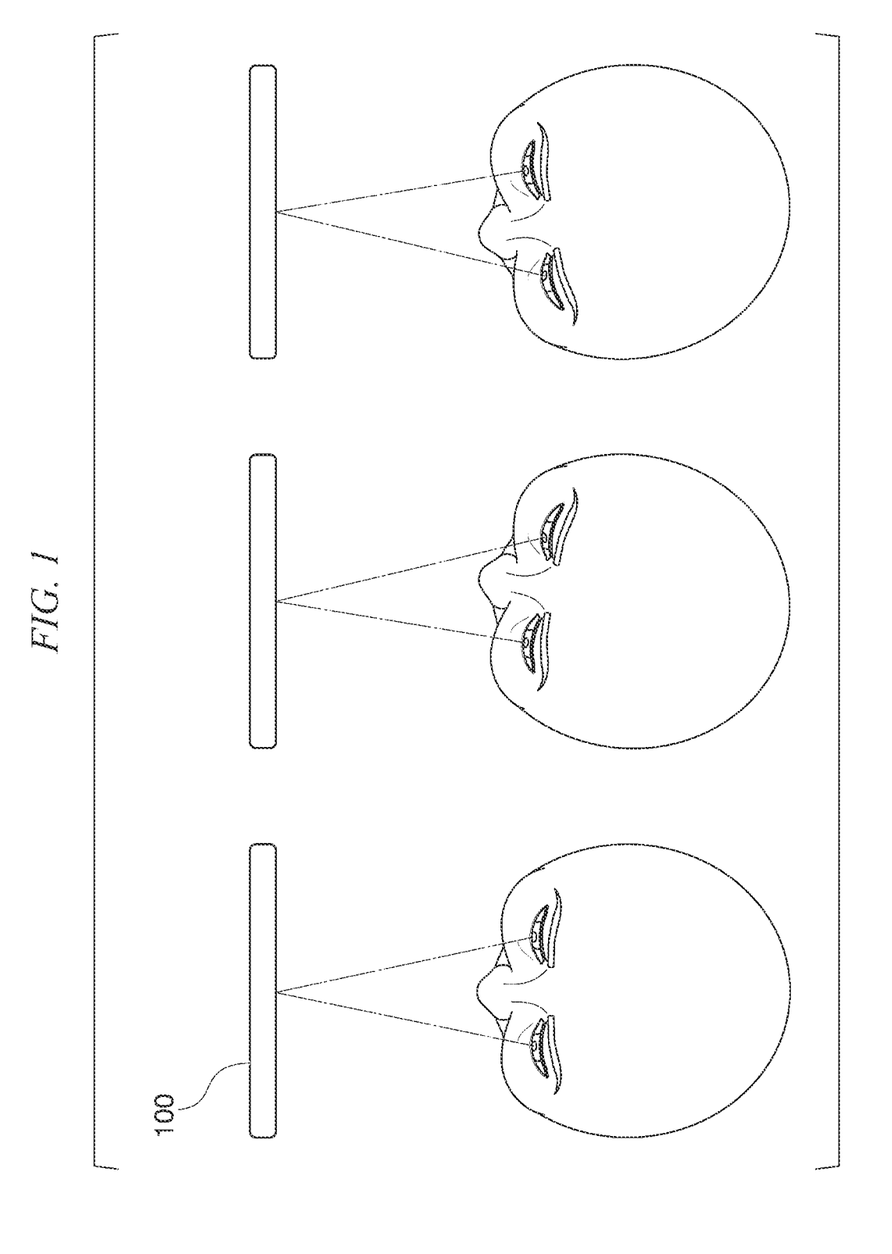
FIG. 1 illustrates the head angle versus the gaze angle of a subject when using an example image processing device of the present disclosure.

FIG. 1 shows an example of the image processing device 100 of the present disclosure in which a subject moves the position of their head while focusing their gaze at the image processing device 100. In this example, the image processing device captures an image of the subject and calculates the gaze angle of the subject in addition to the head angle of the subject. The head angle may be determined, for example, by the distance between the nose of the subject relative to the position of the eyes of the subject or relative to other facial feature points of the subject. The gaze angle may be calculated from the position of the pupil of each eye of the subject in the captured image.

In the case that a three dimensional mask is used to spoof the image processing device, the relative angle difference between the head angle and the gaze angle should remain constant when the head angle is changed. Therefore, it can be determined that the subject is a living person if the head angle and the gaze angle differ while capturing a plurality of images of the subject while the head angle is changed.

Figure 6:
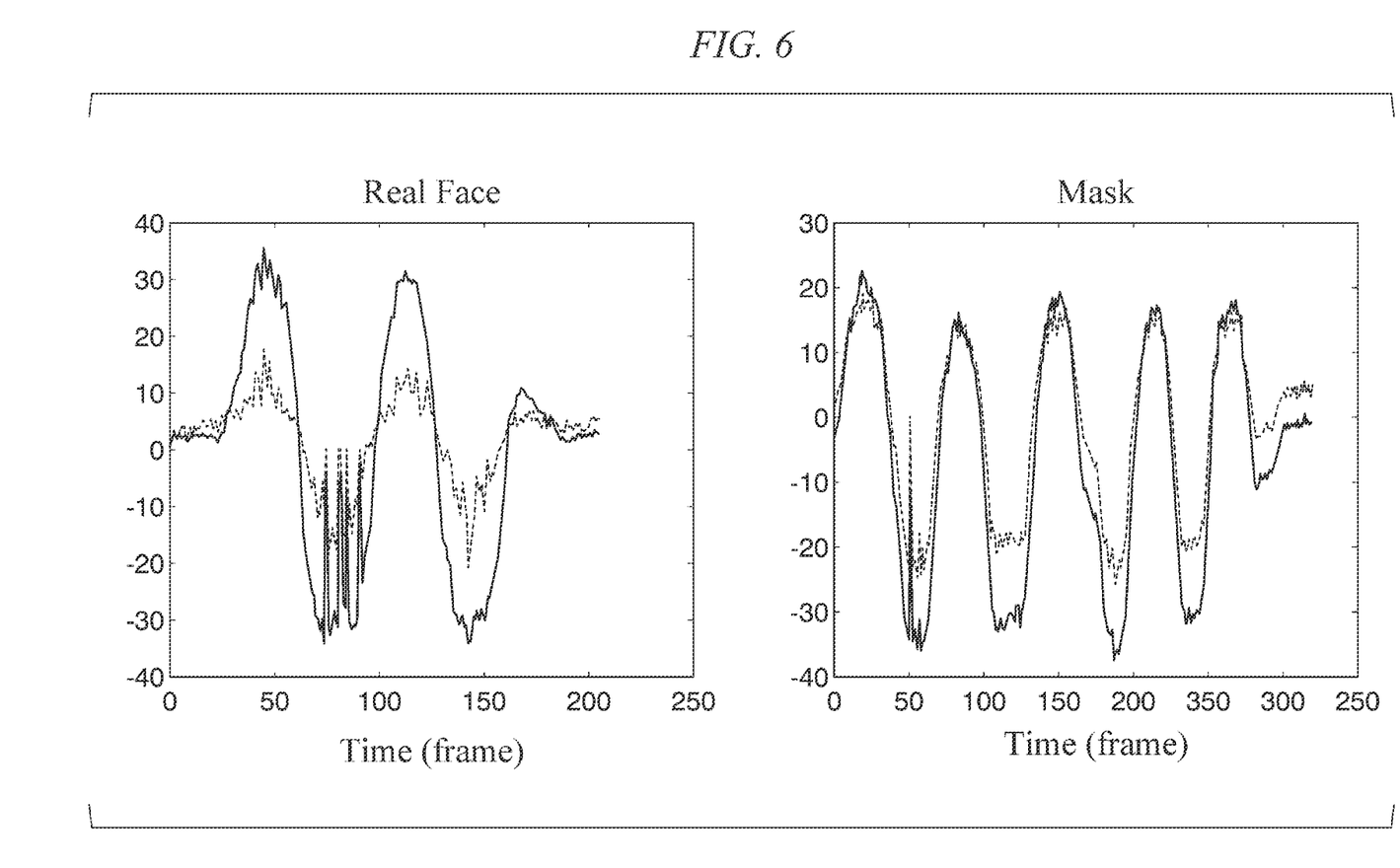
FIG. 6 shows an experimental example of the difference between a subject's gaze angle and head angle while changing the head angle for a living subject versus a three dimensional mask.

One example of the observed difference between a real person and a three dimensional mask while the head angle is changed is shown in FIG. 6. In this figure, the solid line represents the pan angle of the head, and the broken line represents the pan angle of the gaze direction. Given this, a pre-determined threshold difference may be selected to determine whether or not a subject is a real person. In other words, if the difference between the head angle and the gaze angle is greater than the pre-determined threshold, the subject is determined to be a living person and access to the mobile phone (image processing device) may be properly granted. Otherwise, access to the mobile phone will be properly denied, thus realizing increased security and accuracy of facial recognition.

Figure 2:
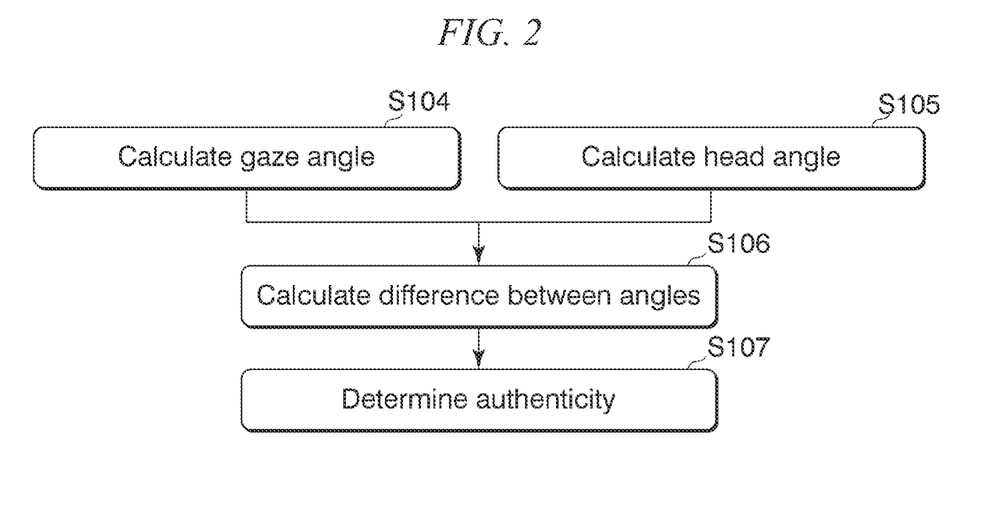
FIG. 2 is a flow chart of an example method of the present disclosure.
Figure 3:
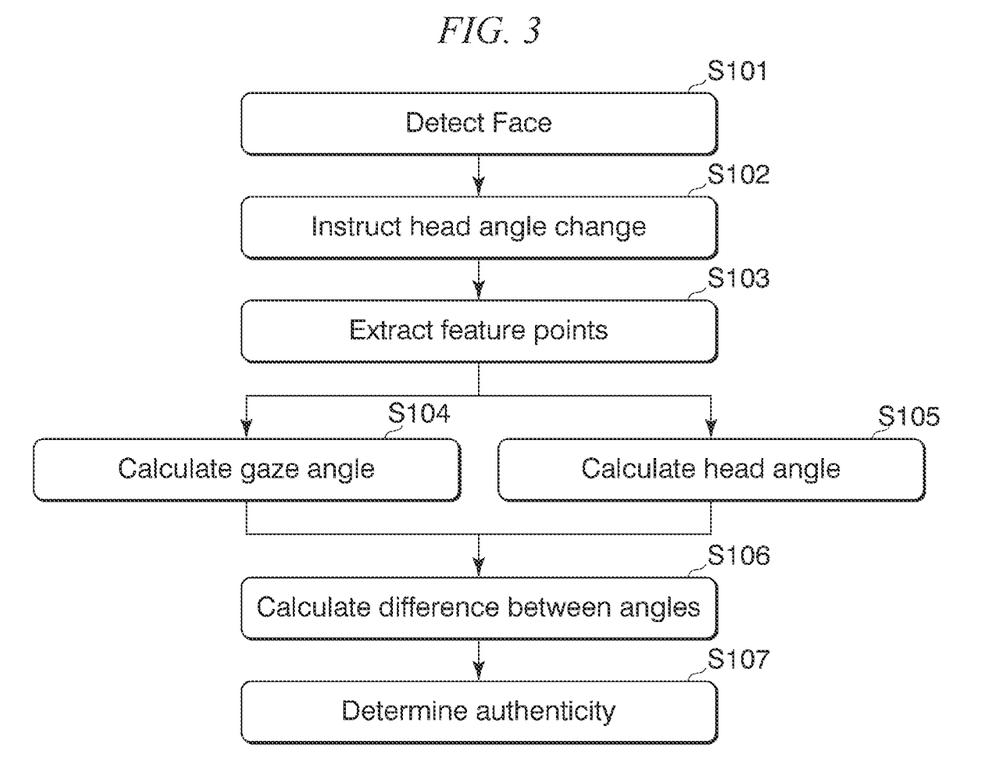
FIG. 3 is another flow chart of an example method of the present disclosure.

With reference to FIGS. 2 and 3, a flow chart of operations will be described.

FIG. 2 shows an example flow chart of confirming the liveliness of a subject. In this method, the gaze angle is calculated (S104) as well as the head angle (S105) from an image of the subject captured by the camera 106. The order of calculating the gaze angle (S104) and calculating the head angle (S105) is not limited as long as both are performed prior to the subsequent step of calculating the difference between the two (S106). In this step (S106), the difference between the gaze angle and the head angle are calculated and compared to that of other images captured by the camera. If the difference in respective images remains constant within a pre-determined threshold, it can be determined that the subject is not a living person (S104) and access to the mobile phone can be properly denied.

Figure 4:
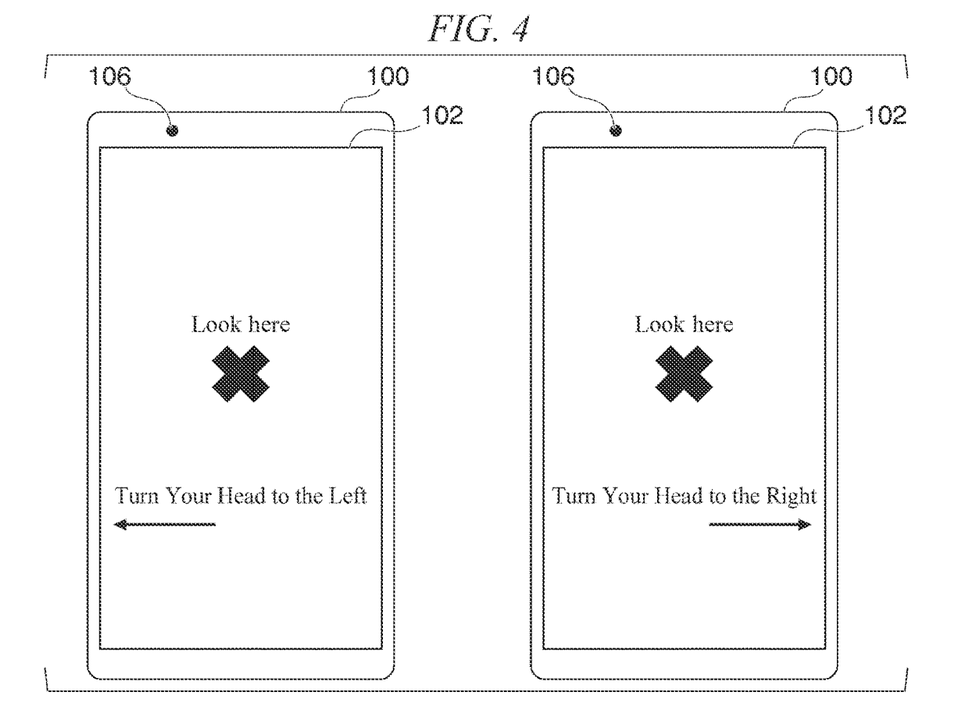
FIG. 4 is an example of a prompt for a subject on the display of an example image processing device of the present disclosure.

FIG. 3 shows additional steps in the flow chart to confirm the identity of the subject and prompt them to change the angle of their head so that the liveliness determination can be made. First, the face of the subject is recognized (S101). This recognition may be performed using known facial recognition algorithms or known facial recognition neural networks. Once a face is recognized, optionally, instructions may be given via a display unit 102 to the subject, for example as shown in FIG. 4, to change their head angle while maintaining a gaze angle toward the image processing device 100 (S102). Thereafter, the camera 106 may capture one or more images such that facial features can be extracted (S103) and the gaze angle and head angle in the image may be calculated (S104, S105).

Other Embodiments

In the above example embodiment, the present disclosure is described in terms of an image processing device and a method to achieve anti-spoofing, however, the present disclosure should not be considered as being limited thereto. Other embodiments are possible without exceeding the scope of the present disclosure. Additions, modifications, and other configurations may also be implemented and still remain within the scope of the present disclosure. Hereinafter, some examples will be described.

The present disclosure may be realized as a non-transitory computer-readable storage medium containing instructions to cause at least one computer or plurality of processors to execute functions described above in the image processing device described in the above example embodiment. A program may realize part of the functions described above. Further, the program may be a file, a so-called differential file (differential program), that can realize the above-described functions in combination with a program already recorded in a computer system.

Figure 5:
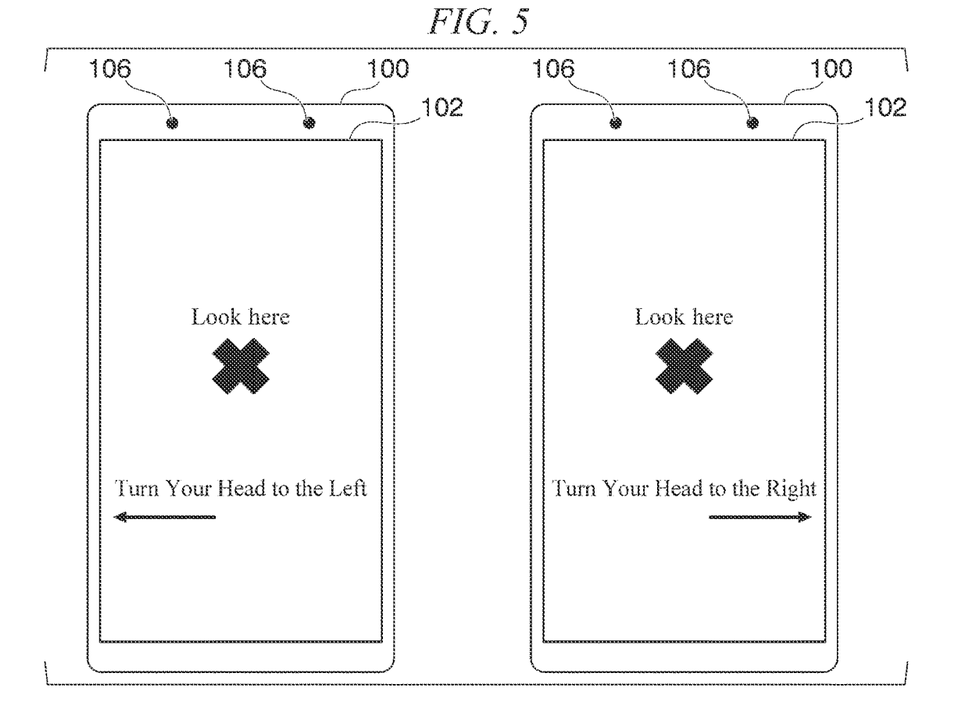
FIG. 5 is an example of a prompt for a subject on the display of another example image processing device of the present disclosure.

In addition, the image processing device described above used a single camera to capture images of a subject. However, multiple cameras, as shown in FIG. 5, may be used to more accurately determine the gaze angle and the head angle of a subject in another example embodiment of the present disclosure, in which multiple images obtained from the multiple cameras having different vantage points are used to extract 3D information of the subject. The extracted 3D information of the subject is taken into account in the calculation of the gaze angle and the head angle.

Further, it may be the case that a three dimensional mask is used to spoof the image processing device 100 and/or the image processing method of the present disclosure where eye holes are cut out of the mask, and the mask is worn by a living person. In such a case, secondary facial features may be detected as a basis for determining whether or not the subject has the necessary liveliness requisite to match the subject with the target. For example, a blink rate, mouth movement, nostril flare, and/or eyebrow movement of the subject may be used to determine whether or not the subject is a living person and the subject may be prompted to perform any of these actions via the display unit 102 or a speaker, in addition to the gaze angle verses head angle determination taught in the present disclosure.

Figure 8:
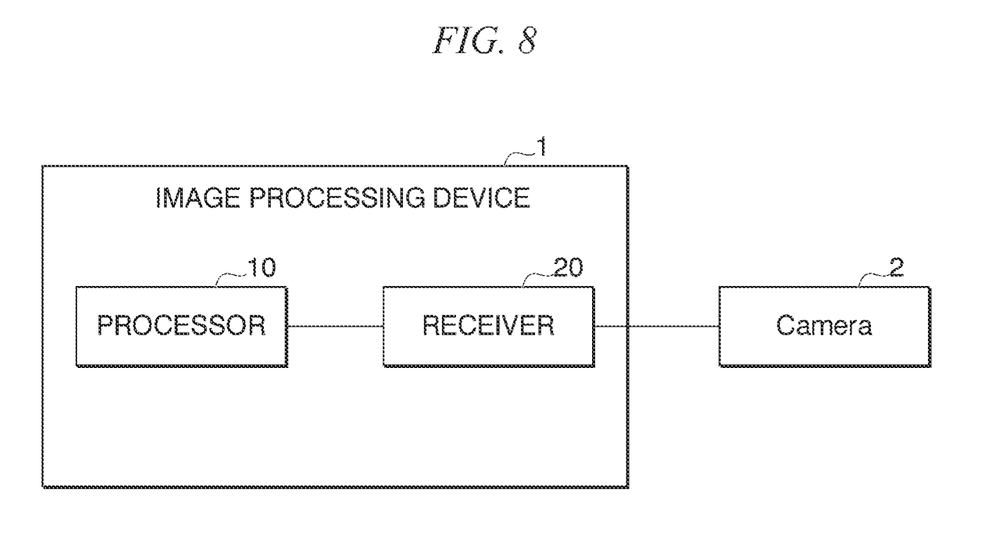
FIG. 8 illustrates an image processing device according to one example embodiment of the present disclosure.

FIG. 8 illustrates an image processing device 1 according to one example embodiment of the present disclosure. The image processing device 1 includes: a receiver 10 and a processor 20. The receiver 10 receives a plurality of images of a subject from a camera 2. The processor 20 calculates, for each of the plurality of images, an angle of difference between a gaze angle and a head angle of the subject and determines an authenticity of the subject at least based on the angles of difference of respective images.

INDUSTRIAL APPLICABILITY

The present disclosure is applicable to the field of computers, computer software, and facial recognition.

REFERENCE SIGNS LIST

100 Image processing device
102 Display unit
104 Processor
106 Camera
108 Storage unit

The invention claimed is:
1. A device comprising:
a display;
at least one memory configured to store instructions; and
at least one processor configured to execute the instructions to:
  display a first guidance, to a user, to maintain a gaze of the user toward a target, the user being captured by a camera;
  display a second guidance, to the user, to change a face direction of the user; and
  determine an authenticity of the user based on a response of the user to the first guidance and the second guidance,
  wherein the first guidance and the second guidance are simultaneously displayed on the display and instruct the user to change the face direction while maintaining the gaze toward the target.
2. The device according to claim 1, wherein the second guidance comprises an instruction, to the user, to turn the face of the user to the left or to the right.
3. The device according to claim 1, further comprising the camera configured to capture an image of the user.
4. The device according to claim 3, wherein the camera captures a plurality of images of the user following the first guidance and the second guidance.
5. The device according to claim 4, wherein the at least one processor is configured to execute the instructions to:
  calculate, for each of the plurality of images, an angle difference between a gaze angle of the user and a face angle of the user in the respective image to obtain a series of angle differences;
  determine whether or not the series of angle differences remain within a predetermined threshold; and
  determine the user is not a living person in a case where the series of angle differences remain within the predetermined threshold.
6. The device according to claim 1, wherein the target is displayed on a first position of the display.
7. The device according to claim 6, wherein the target is fixed on the first position.
8. The device according to claim 1, wherein the at least one processor is configured to execute the instructions to:
  calculate an angle difference between a gaze angle of the user and a face angle of the user; and
  determine the authenticity of the user based on the angle difference.
9. A display method performed by a computer and comprising:
  displaying a first guidance, to a user, to maintain a gaze of the user toward a target, the user being captured by a camera;
  displaying a second guidance, to the user, to change a face direction of the user; and
  determining an authenticity of the user based on a response of the user to the first guidance and the second guidance,
  wherein the first guidance and the second guidance are simultaneously displayed on the display and instruct the user to change the face direction while maintaining the gaze toward the target.
10. The display method according to claim 9, wherein the second guidance comprises an instruction, to the user, to turn the face of the user to the left or to the right.
11. The display method according to claim 9, further comprising capturing a plurality of images of the user following the first guidance and the second guidance by the camera.
12. The display method according to claim 11, further comprising:
  calculating, for each of the plurality of images, an angle difference between a gaze angle of the user and a face angle of the user in the respective image to obtain a series of angle differences;
  determining whether or not the series of angle differences remain within a predetermined threshold; and
  determining the user is not a living person in a case where the series of angle differences remain within the predetermined threshold.
13. The display method according to claim 9, wherein the target is displayed on a first position of the display.
14. The display method according to claim 13, wherein the target is fixed on the first position.
15. The display method according to claim 9, further comprising:
  calculating an angle difference between a gaze angle of the user and a face angle of the user; and
  determining the authenticity of the user based on the angle difference.

16. A non-transitory computer-readable storage medium storing instructions executable by a computer to perform a display method comprising:
- displaying a first guidance, to a user, to maintain a gaze of the user toward a target, the user being captured by a camera; and
- displaying a second guidance, to the user, to change a face direction of the user; and
- determining an authenticity of the user based on a response of the user to the first guidance and the second guidance,
- wherein the first guidance and the second guidance are simultaneously displayed on the display and instruct the user to change the face direction while maintaining the gaze toward the target.

17. The non-transitory computer-readable storage medium according to claim 16, wherein the second guidance comprises an instruction, to the user, to turn the face of the user to the left or to the right.

18. The non-transitory computer-readable storage medium according to claim 16, wherein the target is displayed on a first position of the display.

19. The non-transitory computer-readable storage medium according to claim 18, wherein the target is fixed on the first position.

20. The non-transitory computer-readable storage medium according to claim 16, further comprising:
- calculating an angle difference between a gaze angle of the user and a face angle of the user; and
- determining the authenticity of the user based on the angle difference.

* * * * *